United States Patent
Chen et al.

(10) Patent No.: US 11,232,073 B2
(45) Date of Patent: Jan. 25, 2022

(54) METHOD AND APPARATUS FOR FILE COMPACTION IN KEY-VALUE STORE SYSTEM

(71) Applicant: HUAWEI TECHNOLOGIES CO., LTD., Guangdong (CN)

(72) Inventors: Shimin Chen, Beijing (CN); Liangchang Zhu, Beijing (CN); Jun Zhang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 406 days.

(21) Appl. No.: 15/878,589

(22) Filed: Jan. 24, 2018

(65) Prior Publication Data
US 2018/0150472 A1   May 31, 2018

Related U.S. Application Data

(63) Continuation of application No. PCT/CN2016/074043, filed on Feb. 18, 2016.

(30) Foreign Application Priority Data

Jul. 31, 2015   (CN) .......................... 201510466697.6

(51) Int. Cl.
*G06F 16/00*   (2019.01)
*G06F 16/174*   (2019.01)
(Continued)

(52) U.S. Cl.
CPC .......... *G06F 16/1744* (2019.01); *G06F 3/065* (2013.01); *G06F 3/067* (2013.01);
(Continued)

(58) Field of Classification Search
CPC .... G06F 16/00; G06F 16/162; G06F 16/1744; G06F 16/2282; G06F 16/27;
(Continued)

(56) References Cited

U.S. PATENT DOCUMENTS 7,548,928 B1 *   6/2009   Dean .................... H03M 7/3084
7,567,973 B1 *   7/2009   Burrows ................. G06F 16/22
(Continued)

FOREIGN PATENT DOCUMENTS

CN   103218365 A   7/2013
CN   103473239 A   12/2013
(Continued)

OTHER PUBLICATIONS

Unknown et al: "SMRDB:key-value data store for shingled magnetic recording disks", Proceedings of the 8th ACM International Systems and Storage Conference ON, Systor 15, May 2F-28, 2015, Haifa, Israel, Jan. 1, 2015, XP055455448, 12 pages.
(Continued)

*Primary Examiner* — Vincent F Boccio
(74) *Attorney, Agent, or Firm* — Hauptman Ham, LLP

(57) ABSTRACT

Example methods and apparatuses for file compaction in a key-value store system relating to the field of data processing technologies are described. One example method for file compaction in a key-value store (KV-Store) system includes compacting, according to a to-be-deleted log (Delete Log) that corresponds to a to-be-compacted sorted string table (SSTable), the to-be-compacted SSTable to generate a new SSTable. A key corresponding to a non-latest value in the KV-Store system and stored in the to-be-compacted SSTable is recorded in the Delete Log, and the new SSTable does not include a key-value pair that corresponds to the key in Delete Log. The to-be-compacted SSTable is then deleted.

20 Claims, 8 Drawing Sheets

(51) Int. Cl.
  *G06F 16/27* (2019.01)
  *G06F 16/16* (2019.01)
  *G06F 16/28* (2019.01)
  *G06F 16/22* (2019.01)
  *G06F 3/06* (2006.01)

(52) U.S. Cl.
  CPC .......... *G06F 3/0619* (2013.01); *G06F 3/0652* (2013.01); *G06F 16/00* (2019.01); *G06F 16/162* (2019.01); *G06F 16/2282* (2019.01); *G06F 16/27* (2019.01); *G06F 16/282* (2019.01)

(58) Field of Classification Search
  CPC ...... G06F 16/282; G06F 3/0619; G06F 3/065; G06F 3/0652; G06F 3/067; G06F 11/1471; G06F 16/125
  USPC ........................................................ 707/693
  See application file for complete search history.

(56) References Cited

U.S. PATENT DOCUMENTS

| | | | |
|---|---|---|---|
| 2007/0033354 A1* | 2/2007 | Burrows | G06F 16/184 711/156 |
| 2014/0258234 A1 | 9/2014 | Michels et al. | |
| 2014/0297601 A1 | 10/2014 | Pruner | |
| 2016/0085480 A1* | 3/2016 | Chiu | G06F 3/061 711/117 |

FOREIGN PATENT DOCUMENTS

| | | |
|---|---|---|
| CN | 103744628 A | 4/2014 |
| CN | 103812877 A | 5/2014 |
| GB | 2512432 A | 10/2014 |

OTHER PUBLICATIONS

Christof Strauch et al.: "NoSQL Databases Lecture Selected Topics on Software-Technology Ultra-Large Scale Sites" In:"NoSQL Databases Lecture Selected Topics on Software-Technology Ultra-Large Scale Sites", Jun. 10, 2009, XP055455456, 150 pages.
Martin Werner et al: "The Gaussian Bloom Filter", Database Systems for Advanced Applications, Jan. 1, 2015, XP055455670, 16 pages.
Extended European Search Report issued in European Application No. 16832065.3 dated Mar. 9, 2018, 10 pages.
Chinese Office Action issued in Chinese Application No. 201510466697.6 dated Jan. 30, 2019, 14 pages.
International Search Report and Written Opinion in International Application No. PCT/CN2016/074043, dated May 20, 2016, 13 pages.

* cited by examiner

METHOD AND APPARATUS FOR FILE COMPACTION IN KEY-VALUE STORE SYSTEM

CROSS-REFERENCE TO RELATED APPLICATION

This application is a continuation of International Patent Application No. PCT/CN2016/074043, filed on Feb. 18, 2016, which claims priority to Chinese Patent Application No. 201510466697.6, filed on Jul. 31 2015. Both of the aforementioned applications are hereby incorporated by reference in their entireties.

TECHNICAL FIELD

The present disclosure relates to the field of data processing technologies, and in particular, to a method and an apparatus for file compaction in a key-value Store (KV-Store) system.

BACKGROUND

KV-Store systems are widely applied to big data storage and processing. Data models of the systems use a key-value pair as a basic unit. Basic operations provided by the systems include a GET (read) operation and a PUT (write) operation.

A process of performing a PUT operation by a server generally includes: first, writing a key-value pair into a memory table (MemTable) that is in a memory; when the MemTable is full, creating an sorted string table (SSTable) in an external storage (for example, a magnetic disk), and then sorting and writing key-value pairs that are in the MemTable into the SSTable. In the PUT operation, when replacing old values of the key-value pairs with new values, the old values that are still stored in an SSTable in the external storage are not deleted. The process is repeated. As a quantity of PUT operations increases, the external storage may include one or more SSTables, and a large quantity of replaced old values constantly accumulating in the SSTables also occupy space and affect performance. All or some of the SSTables are subsequently merged by using a compaction mechanism, to delete key-value pairs corresponding to non-latest values that correspond to a same key, to achieve an objective of reducing storage space.

Currently, compaction is generally multi-file compaction, that is, merging of multiple SSTables is implemented, and the compaction may be classified into major compaction and minor compaction. The major compaction refers to that all SSTables are merged at a time, and the minor compaction refers to that some SSTables are merged at a time.

When a compaction operation is performed by using the foregoing method, data in multiple to-be-compacted SSTables needs to be simultaneously read, and this needs to occupy a large quantity of I/O bandwidth and memory resources. As a result, while the compaction operation is performed by using the foregoing method, relatively few resources reserved for other operations and low rates of performing other operations affect usage by a user.

SUMMARY

Embodiments of the present disclose provide a method and an apparatus for file compaction in a key-value store system, to reduce I/O bandwidth and memory resources that need to be occupied when a compaction operation is performed. Therefore, in a process of performing a compaction operation, rates of performing other operations are not affected, and user experience is improved.

To achieve the foregoing objective, the embodiments of the present disclose use the following technical solutions:

According to a first aspect, a method for file compaction in a key-value store KV-Store system is provided, including:

compacting, according to a to-be-deleted log Delete Log that corresponds to a to-be-compacted sorted string table SSTable, the to-be-compacted SSTable, to generate a new SSTable, where a key corresponding to a non-latest value that is in the KV-Store system and that is stored in the to-be-compacted SSTable is recorded in the Delete Log, and the new SSTable does not include a key-value pair that corresponds to the key in Delete Log; and deleting the to-be-compacted SSTable.

With reference to the first aspect, in a first possible implementation manner, before the compacting, according to a to-be-deleted log Delete Log that corresponds to a to-be-compacted sorted string table SSTable, the to-be-compacted SSTable, to generate a new SSTable, the method further includes:

determining, in the to-be-compacted SSTable, the key that corresponds to the non-latest value in the KV-Store system as a target key; and recording the target key in the Delete Log.

With reference to the first possible implementation manner of the first aspect, in a second possible implementation manner, the recording the target key in the Delete Log includes:

recording the target key in the Delete Log when it is determined that the Delete Log does not include the target key.

With reference to any one of the first aspect, or the first possible implementation manner or the second possible implementation manner of the first aspect, in a third possible implementation manner, the compacting, according to a to-be-deleted log Delete Log that corresponds to a to-be-compacted sorted string table SSTable, the to-be-compacted SSTable, to generate a new SSTable includes:

copying a key-value pair that is in the to-be-compacted SSTable and that corresponds to a key not belonging to the Delete Log, to generate a new SSTable.

With reference to the first aspect, in a fourth possible implementation manner, before the compacting, according to a to-be-deleted log Delete Log that corresponds to a to-be-compacted sorted string table SSTable, the to-be-compacted SSTable, to generate a new SSTable, the method further includes:

receiving a GET operation that carries a key to be searched for; and determining, after a latest value that corresponds to the key to be searched for is obtained according to the GET operation, an SSTable in which a second-latest value that corresponds to the key to be searched for is located, and recording, in a Delete Log that corresponds to the determined SSTable, the key to be searched for.

With reference to the first aspect, in a fifth possible implementation manner, the KV-Store system is applied to an incremental storage scenario, and before the compacting, according to a to-be-deleted log Delete Log that corresponds to a to-be-compacted sorted string table SSTable, the to-be-compacted SSTable, to generate a new SSTable, the method further includes:

receiving a GET operation that carries a key to be searched for;

determining, after a latest value that corresponds to the key to be searched for is obtained according to the GET operation, an SSTable in which the latest value that corresponds to the key to be searched for is located, and recording, in a Delete Log that corresponds to the determined SSTable, the key to be searched for; and receiving a PUT operation that carries the key to be searched for.

With reference to the fourth possible implementation manner or the fifth possible implementation manner of the first aspect, in a sixth possible implementation manner, the recording, in a Delete Log that corresponds to the determined SSTable, the key to be searched for includes:

when the Delete Log that corresponds to the determined SSTable does not include the key to be searched for, recording, in the Delete Log that corresponds to the determined SSTable, the key to be searched for.

With reference to the first aspect, in a seventh possible implementation manner, the compacting, according to a to-be-deleted log Delete Log that corresponds to a to-be-compacted sorted string table SSTable, the to-be-compacted SSTable, to generate a new SSTable includes:

compacting the to-be-compacted SSTable according to the Delete Log when a quantity of keys in the Delete Log that corresponds to the to-be-compacted SSTable is greater than or equal to a preset threshold, to generate a new SSTable.

With reference to the first aspect, in an eighth possible implementation manner, the to-be-compacted SSTable corresponds to a Bloom filter, keys in the Delete Log are recorded in the Bloom filter Bloom filter, and the method further includes:

setting an initial value of the Bloom filter to null after a server in which the KV-Store system is located is recovered from a fault, or when the KV-Store system is a distributed storage system and the Delete Log is a local Delete Log, determining, after the server in which the KV-Store system is recovered from a fault, an initial value of the Bloom filter according to keys recorded in a global Delete Log, where keys in the local Delete Log are recorded in the global Delete Log.

According to a second aspect, a server is provided, including a key-value store KV-Store system, and the server further includes:

a compaction unit, configured to compact, according to a to-be-deleted log Delete Log corresponding to a to-be-compacted sorted string table SSTable, the to-be-compacted SSTable, to generate a new SSTable, where a key corresponding to a non-latest value that is in the KV-Store system and that is stored in the to-be-compacted SSTable is recorded in the Delete Log, and the new SSTable does not include a key-value pair that corresponds to the key in Delete Log; and a deletion unit, configured to delete the to-be-compacted SSTable.

With reference to the second aspect, in a first possible implementation manner, the server further includes:

a first determining unit, configured to determine, in the to-be-compacted SSTable, the key that corresponds to the non-latest value in the KV-Store system as a target key; and a recording unit, configured to record the target key in the Delete Log.

With reference to the first possible implementation manner of the second aspect, in a second possible implementation manner, the recording unit is configured to record the target key in the Delete Log when it is determined that the Delete Log does not include the target key.

With reference to any one of the second aspect, or the first possible implementation manner of the second aspect or the second possible implementation manner of the second aspect, in a third possible implementation manner, the compaction unit is configured to: copy a key-value pair that is in the to-be-compacted SSTable and that corresponds to a key not belonging to the Delete Log, to generate the new SSTable.

With reference to the second aspect, in a fourth possible implementation manner, the server further includes:

a receiving unit, configured to receive a read GET operation that carries a key to be searched for; and a second determining unit, configured to determine, after a latest value that corresponds to the key to be searched for is obtained according to the GET operation, an SSTable in which a second-latest value that corresponds to the key to be searched for is located, and record, in a Delete Log that corresponds to the determined SSTable, the key to be searched for.

With reference to the second aspect, in a fifth possible implementation manner, the KV-Store system is applied to an incremental storage scenario, and the server further includes:

a receiving unit, configured to receive a GET operation that carries a key to be searched for; and a second determining unit, configured to determine, after a latest value that corresponds to the key to be searched for is obtained according to the GET operation, an SSTable in which the latest value that corresponds to the key to be searched for is located, and record, in a Delete Log that corresponds to the determined SSTable, the key to be searched for: and the receiving unit is further configured to receive a write PUT operation that carries the key to be searched for.

With reference to the fourth possible implementation manner or the fifth possible implementation manner of the second aspect, in a sixth possible implementation manner, when recording, in a Delete Log that corresponds to the determined SSTable, the key to be searched for, the second determining unit is configured to:

when the Delete Log that corresponds to the determined SSTable does not include the key to be searched for, record, in the Delete Log that corresponds to the determined SSTable, the key to be searched for.

With reference to the second aspect, in a seventh possible implementation manner, the compaction unit is configured to compact the to-be-compacted SSTable according to the Delete Log when a quantity of keys in the Delete Log that corresponds to the to-be-compacted SSTable is greater than or equal to a preset threshold, to generate a new SSTable.

With reference to the second aspect, in an eighth possible implementation manner, the to-be-compacted SSTable corresponds to a Bloom filter Bloom filter, keys in the Delete Log are recorded in the Bloom filter, and the server further includes a third determining unit, configured to:

set an initial value of the Bloom filter to null after a server in which the KV-Store system is located is recovered from a fault, or when the KV-Store system is a distributed storage system and the Delete Log is a local Delete Log, determine, after the server in which the KV-Store system is recovered from a fault, an initial value of the Bloom filter according to keys recorded in a global Delete Log, where keys in the local Delete Log are recorded in the global Delete Log.

In the foregoing technical solutions, a to-be-compacted SSTable is compacted according to a Delete Log that corresponds to the to-be-compacted SSTable, to generate a new SSTable. A key corresponding to a non-latest value that is in the KV-Store system and that is stored in the to-be-compacted SSTable is recorded in the Delete Log, and the new SSTable does not include a key-value pair that corresponds to the key in Delete Log. Then, the to-be-compacted SSTable is deleted, thereby implementing single-file compaction. In this method, data in only one SSTable needs to be read each time a compaction operation is performed; compared with a method for multi-file compaction in the prior art, fewer I/O bandwidth and memory resources are occupied. In this way, while a compaction operation is performed by using this method, more resources may be reserved for other operations, so that rates of performing other operations are not affected, thereby improving user experience.

BRIEF DESCRIPTION OF DRAWINGS

To describe the technical solutions in the embodiments of the present disclose or in the prior art more clearly, the following briefly describes the accompanying drawings required for describing the embodiments or the prior art. The accompanying drawings in the following description show merely some embodiments of the present disclose, and a person of ordinary skill in the art may still derive other drawings from these accompanying drawings without creative efforts.

DESCRIPTION OF EMBODIMENTS

Figure 1:
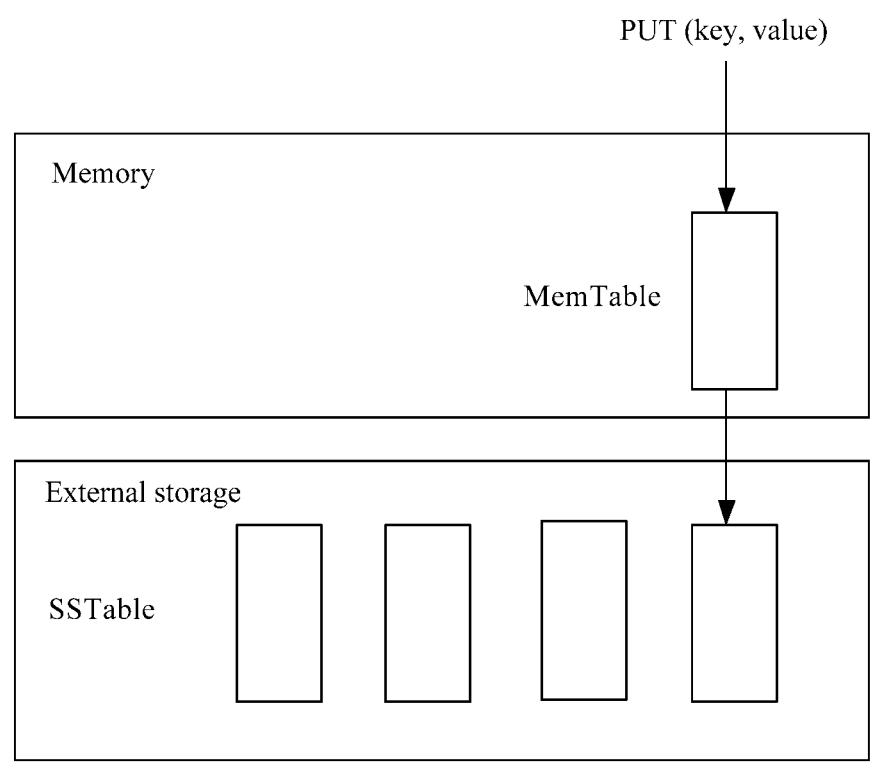
FIG. 1 is a schematic diagram of a process of performing a PUT operation according to the prior art.

The following clearly describes the technical solutions in the embodiments of the present disclose with reference to the accompanying drawings in the embodiments of the present disclose. The described embodiments are merely some but not all of the embodiments of the present disclose. All other embodiments obtained by a person of ordinary skill in the art based on the embodiments of the present disclose without creative efforts shall fall within the protection scope of the present disclose.

The following first explains some terms in the embodiments of the present disclose, so that a person skilled in the art may easily understand.

1). KV-Store System

A "KV-Store system" in the embodiments of the present disclose may be a distributed storage system, or may be a local storage system. When the "KV-Store system" is a distributed storage system, the KV-Store system may be distributed on multiple servers. Each server runs some processes of the KV-Store system. All data of the KV-Store system is divided into multiple subsets. Each subset is managed by processes of the KV-Store system in one server. When the "KV-Store system" is a local file storage system, the KV-Store system is included in one server. All data of the KV-Store system is managed by processes of the KV-Store system in the server.

2). PUT Operation

A PUT operation carries one key-value pair, and may be represented as a PUT (key, value) operation.

A process of performing a PUT (key, value) operation by a server may include: first, writing a key-value pair carried in the PUT operation into a MemTable in a memory; when the MemTable is full, creating an SSTable in an external storage, and sorting and writing key-value pairs that are in the MemTable into the SSTable.

The "writing a key-value pair carried in the PUT operation into a MemTable" may include: if the key carried in the PUT operation is already included in the MemTable, updating a value corresponding to the key that is included in the MemTable with the value carried in the PUT operation, and if the key carried in the PUT operation is not included in the MemTable, writing the key-value pair carried in the PUT operation into the MemTable.

It should be noted that, writing is performed on the SSTable is only once when the SSTable is created, and the SSTable becomes a read-only file afterwards, which cannot be modified, but can be deleted. It can be seen from the foregoing description that although the PUT operation of the KV-Store system replaces an old value of a key-value pair with a new value, the old value is still stored in an SSTable of the external storage. In particular, for a key frequently modified and updated, actual old values that are stored in the external storage occupy space multiple times more than a value in a latest key-value pair.

In addition, it should be noted that, as a quantity of PUT operations increases, a quantity of SSTables in the external storage gradually increases. Generally, keys in any two key-value pairs in an SSTable are different, and different SSTables may include key-value pairs having a same key. Different SSTables are sorted according to creation time points, and key-value pairs in a same SSTable are sorted according to sizes of keys.

In addition, it should be noted that, when the KV-Store system is a distributed storage system, generally, all key-value pairs corresponding to one key are recorded in a same server, and key-value pairs corresponding to different keys may be recorded in different servers.

Referring to FIG. 1, FIG. 1 is a schematic diagram of a process of performing a PUT operation according to the prior art.

3). GET Operation

A GET operation carries one key, and may be represented as a GET (key) operation, and is used to search for a latest value that corresponds to the key. It should be noted that, the key carried in the GET operation is referred to as "a key to be searched for" hereinafter.

A process of performing a GET (key) operation by a server may include: first, searching a MemTable for a key carried in the GET operation; if the key is found, outputting a value that corresponds to the key, and if the key is not found, sequentially searching, from a latest SSTable to an oldest SSTable according to creation time points, for the key carried in the GET operation, and if the key is found, outputting a value the corresponds to the key. The output value is a latest value corresponding to the key.

It should be noted that, during implementation, a Bloom filter and a block index corresponding to each SSTable are cached in a memory of the server. The Bloom filter is generally configured to provide a filtering function for a query. For example, for a set A={a0, a1, . . . , an}, if it needs to know whether b belongs to A, a bit vector of m bits may be first created. Each bit of the bit vector is initially 0. Then, k Hash functions (for example, Hash0, Hash1, . . . , Hashk) which are different from each other are determined. m and k are adjustable parameters. Then, Hash functions are calculated for each element aj in A, and corresponding positions are set to 1, that is, all Hashi(aj) positions are set to 1. The process is repeated, so that the operation is performed on all elements in A, and a bit vector finally obtained is a Bloom filter representing A. For element b that needs to be queried, k Hash functions of b may be calculated, and corresponding positions in a bit vector, that is, all positions corresponding to Hashi(b), are tested. B may appear in A only when all k bits in calculation results of the Hash functions of b are 1. If any of the k bits in the calculation results of the Hash functions of b is 0, b is definitely not in A. Therefore, a case in which b does not belong to A can be quickly filtered out by using the Bloom filter. The block index is used to record, in an SSTable and at intervals of a specific quantity of key-value pairs, a key and a byte position at which the key is located.

The "searching an SSTable for a key carried in the GET operation" may include: after the test performed by using the Bloom filter that corresponds to the SSTable, searching block indexes that correspond to the SSTable for the key carried in the GET operation, and if the key is found in a block index, searching a block that corresponds to the block index for the key, and outputting a value that corresponds to the key. One SSTable may include multiple Blocks.

Figure 2:
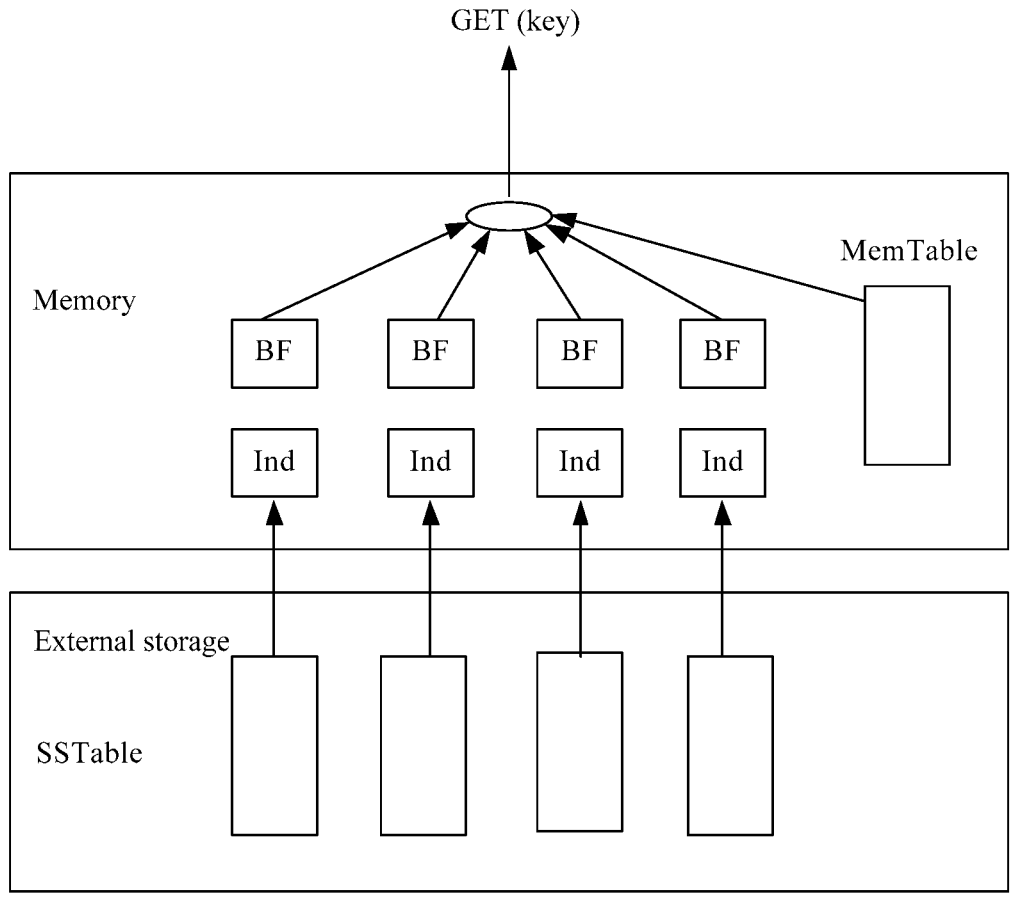
FIG. 2 is a schematic diagram of a process of performing a GET operation according to the prior art.

Referring to FIG. 2, FIG. 2 is a schematic diagram of a process of performing a GET operation according to the prior art. The "BF" in FIG. 2 represents a Bloom filter, that is, the following BFs. The "Ind" represents a block index.

4). Delete Log (to-be-deleted log)

A Delete Log is a log file created for an SSTable in an embodiment of the present disclose, and is used to record a key that corresponds to a non-latest value in the SSTable that corresponds to the Delete Log. A Log file is a special file that records information about an operation according to a time sequence, and information is only appended at the end of the file.

The Delete Log is located in an external storage. During implementation, a Delete Log may be created for each SSTable, or a common Delete Log may be created for multiple SSTables. For example, when a server generates an SSTable in an external storage, a Delete Log is created for the SSTable. Alternatively, when the server generates a preset quantity of SSTables in the external storage, a Delete Log is created for the preset quantity of SSTables. A value of the "preset quantity" and a method of selecting the value are not limited in the embodiments of the present disclose.

5). BFs and BFd

In some embodiments/implementation manners of the present disclose, a Bloom filter is set in a memory for an SSTable. To distinguish between a "Bloom filter corresponding to an SSTable" in a GET operation in the prior art and a "Bloom filter corresponding to an SSTable" newly added in the embodiments of the present disclose, in this specification, the "Bloom filter corresponding to an SSTable" in the prior art is referred to as a BFs and the "Bloom filter corresponding to an SSTable" newly added in the embodiments of the present disclose is referred to as a BFd. A "BFd corresponding to an SSTable" is configured to filter out a key in a Delete Log that corresponds to the SSTable.

6). The term "and/or" in this specification is merely an association relationship for describing associated objects and indicates that three relationships may exist. For example, A and/or B may indicate the following three cases: Only A exists, both A and B exist, and only B exists; "/" indicates "or"; "multiple" indicates two or more.

Embodiment 1

Figure 3:
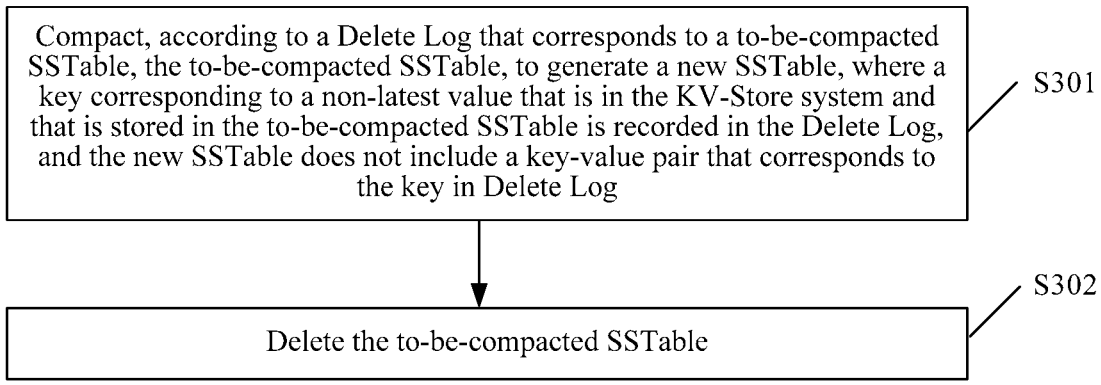
FIG. 3 is a schematic flowchart of a method for file compaction in a KV-Store system according to Embodiment 1 of the present disclose.

Referring to FIG. 3, FIG. 3 is a schematic flowchart of a method for file compaction in a KV-Store system according to an embodiment of the present disclose. The method shown in FIG. 3 is applied to a server including a KV-Store system. The method includes the following steps S301 to S302.

S301: Compact, according to a Delete Log that corresponds to a to-be-compacted SSTable, the to-be-compacted SSTable, to generate a new SSTable, where a key corresponding to a non-latest value that is in the KV-Store system and that is stored in the to-be-compacted SSTable is recorded in the Delete Log, and the new SSTable does not include a key-value pair that corresponds to the key in Delete Log.

The method provided in this embodiment may be performed by a server including a KV-Store system. When the "KV-Store system" is a distributed storage system, the "server including a KV-Store system" may be any server in which the KV-Store system is distributed, that is, any server including a process of the KV-Store system.

The "to-be-compacted SSTable" may be any SSTable in the KV-Store system. The "to-be-compacted SSTable" may separately correspond to a Delete Log, or may share a Delete Log with another SSTable in the KV-Store system.

"Values in the KV-Store system" include values recorded in memories and external storages of all servers in which the KV-Store system is located, and specifically include values recorded in MemTables and SSTables of all servers in which the KV-Store system is located. A "latest value in the KV-Store system" may be recorded in a MemTable or an SSTable. A "non-latest value in the KV-Store system" is generally recorded in an SSTable. The "non-latest value" refers to a value in a key-value pair that is among multiple key-value pairs having a same key and that is not last recorded, and may include: a value that is among multiple key-value pairs having a same key and that is recorded once or multiple times in "the first, the second, the third, . . . the $(i-1)^{th}$" times. A value that is recorded in the $(i-1)^{th}$ time is a "second-latest value" corresponding to the key; i is an integer greater than or equal to 1. It should be noted that, the multiple key-value pairs having a same key may be recorded in multiple SSTables, or may be recorded in a MemTable and one/multiple SSTables.

It can be known from the foregoing description that the key recorded in the "Delete Log" has been recorded at least in a MemTable, or in an SSTable created after the to-be-compacted SSTable (that is, an SSTable newer than the to-be-compacted SSTable). A specific implementation manner of recording a key in a Delete Log is not limited in this embodiment of the present disclose.

Optionally, step S301 may be implemented in the following manner: copying a key-value pair that is in the to-be-compacted SSTable and that corresponds to a key not belonging to the Delete Log, to generate a new SSTable. For example, the new SSTable is generated by merging the to-be-compacted SSTable and the Delete Log, and copying a key-value pair that is in the to-be-compacted SSTable and that corresponds to a key not belonging to the Delete Log. Reference may be made to a merging operation in the prior art for an implementation manner of "merging the to-be-compacted SSTable and the Delete Log".

It should be noted that, after step S301, the method may further include: creating a new Delete Log for the new SSTable, to prepare for compacting the new SSTable.

S302: Delete the to-be-compacted SSTable.

Step S302 may be understood as replacing the to-be-compacted SSTable with the new SSTable generated in step S301.

It should be noted that, after S302 is performed, the method may further include: deleting information that corresponds to the to-be-compacted SSTable. The information corresponding to the to-be-compacted SSTable may include, but is not limited to, the following one of or more of types of information: the Delete Log corresponding to the to-be-compacted SSTable, a Delete Log buffer (a to-be-deleted log buffer) in a subsequent optional implementation manner, a BFd corresponding to the to-be-compacted SSTable, and the like.

In the method for file compaction in a KV-Store system provided in this embodiment, a to-be-compacted SSTable is compacted according to a Delete Log that corresponds to the to-be-compacted SSTable, to generate a new SSTable. A key corresponding to a non-latest value that is in the KV-Store system and that is stored in the to-be-compacted SSTable is recorded in the Delete Log, and the new SSTable does not include a key-value pair that corresponds to the key in Delete Log. Then, the to-be-compacted SSTable is deleted, thereby implementing single-file compaction. In this method, data in only one SSTable needs to be read each time a compaction operation is performed; compared with the method for multi-file compaction in the prior art, fewer I/O bandwidth and memory resources are occupied. In this way, while a compaction operation is performed by using this method, more resources may be reserved for other operations, so that rates of performing other operations are not affected, thereby improving user experience.

In addition, compared with the method for multi-file compaction provided in the prior art, by using the method for single-file compaction provided in this embodiment of the present disclose, less data needs to be processed in each compaction operation process, and therefore, a shorter time is required. In this way, a longer processing time may be reserved for other operations, thereby improving user experience.

Further, to ensure read-write efficiency, a read-write buffer generally needs to be set in the memory. In the method for multi-file compaction provided in the prior art, each time a compaction operation is performed, data in multiple SSTables needs to be read. As a result, a large read-write buffer needs to be set in the memory, occupying many memory resources. However, by using the method for single-file compaction provided in this embodiment of the present disclose, data in only one SSTable needs to be read. Therefore, compared with the prior art, less space is occupied by a read-write buffer that needs to be set in the memory, that is, fewer memory resources are occupied. In this way, more memory resources may be reserved for other operations, thereby improving performance of the KV-Store system.

In an optional implementation manner, step S301 may include: compacting the to-be-compacted SSTable according to the Delete Log when a quantity of keys in the Delete Log that corresponds to the to-be-compacted SSTable is greater than or equal to a preset threshold.

For example, in this optional implementation manner, the "quantity of keys in the Delete Log that corresponds to the to-be-compacted SSTable is greater than or equal to a preset threshold" is used as a trigger condition of compacting the to-be-compacted SSTable. During specific implementation, the to-be-compacted SSTable may also be compacted under another trigger condition. For example, the to-be-compacted SSTable is compacted at a preset time point or periodically. The preset time point may be a specific time point, or may be a time point when a server is idle, and the like. A value of the "preset threshold" and a method of obtaining the value are not limited in this embodiment of the present disclose. For example, the value may be half the quantity of keys in the to-be-compacted SSTable, and may certainly be another value.

In an optional implementation manner, before step S301, the method may further include: determining, in the to-be-compacted SSTable, the key that corresponds to the non-latest value in the KV-Store system as a target key; and recording the target key in the Delete Log.

For example, if the to-be-compacted SSTable is an SSTable last created in the KV-Store system (that is, a latest SSTable), the server may compare the to-be-compacted SSTable with the MemTable, to use a key that is in the to-be-compacted SSTable and that is recorded in the MemTable as the target key. If the to-be-compacted SSTable is not an SSTable last created in the KV-Store system, the server may compare the to-be-compacted SSTable with the MemTable, and compare the to-be-compacted SSTable with an SSTable created after the to-be-compacted SSTable, to use a key that is in the to-be-compacted SSTable and that is recorded in the MemTable/the SSTable created after the to-be-compacted SSTable as the target key.

It should be noted that, in this optional implementation manner, if none of the keys in the to-be-compacted SSTable is recorded in the MemTable and the SSTable created after the to-be-compacted SSTable, the to-be-compacted SSTable does not include the target key.

For example, the recording the target key in the Delete Log may include: recording the target key in the Delete Log when it is determined that the Delete Log does not include the target key. This method can prevent the target key from being repeatedly recorded in the Delete Log. A Bloom filter may be created in advance, in a memory of the server, for the to-be-compacted SSTable. Keys in the Delete Log are recorded in the Bloom filter. In this case, the "recording the target key in the Delete Log when it is determined that the Delete Log does not include the target key" may include: recording the target key in the Delete Log when the Bloom filter does not include the target key.

During specific implementation, the server may preset a Bloom filter (that is, BFd) for each SSTable. It can be known according to a basic principle of the Bloom filter that, if the target key does not pass a test of the BFd that corresponds to the to-be-compacted SSTable, the target key is not recorded in the Delete Log, That "the Bloom filter does not include the target key" is considered as that the target key does not pass the test of the Bloom filter.

Further, optionally, the Delete Log corresponds to a Delete Log buffer in the memory. In this case, the recording the target key in the Delete Log may include: recording the target key in the Delete Log when a quantity of target keys in the Delete Log buffer is greater than or equal to a second preset threshold.

For example, in this optional implementation manner, the server may set a Delete Log buffer for each Delete Log in the memory, and first record a target key in the Delete Log buffer corresponding to the Delete Log. When the quantity of target keys in the Delete Log buffer is greater than or equal to the second preset threshold, the server then sequentially writes the keys in the Delete Log buffer into the Delete Log. Because a data read-write rate of the server in the memory is much greater than a data read-write rate in an external storage, this optional implementation manner can increase the data read-write rate of the server, thereby improving overall performance of the KV-Store system. A specific value of the "second preset threshold" and an obtaining method of the value are not limited in this embodiment of the present disclose. For example, the value may be a maximum value of the quantity of target keys that can be accommodated in the Delete Log buffer.

This embodiment of the present disclose further provides a technical solution of recording a key in a Delete Log according to a GET operation. This may include the following two optional implementation manners.

Optional implementation manner 1: A GET operation that carries a key to be searched for is received; after a latest value that corresponds to the key to be searched for is obtained according to the GET operation, an SSTable in which a second-latest value that corresponds to the key to be searched for is located is determined, and the key to be searched for is recorded in a Delete Log that corresponds to the determined SSTable.

For example, in this optional implementation manner, under a trigger condition that a server completes performing of a GET operation in the prior art, that is, under a trigger condition that the server receives a latest value that corresponds to a key to be searched for and carried in the GET operation, an SSTable in which a second-latest value that corresponds to the key to be searched for is located is determined, and the key to be searched for is recorded in a Delete Log that corresponds to the SSTable.

In this optional implementation manner, the "non-latest value" in step S301 is embodied as a "second-latest value". The "latest value corresponding to the key to be searched for" may be considered as a value in a MemTable or an SSTable. Reference may be made to the foregoing text for an implementation manner of obtaining, by the server according to the GET operation, a latest value that corresponds to the key to be searched for. This is not described in detail herein again. The server may obtain, by using the method of obtaining the latest value that corresponds to the key to be searched for, a second-latest value that corresponds to the key to be searched for.

Optional implementation manner 2: when the KV-Store system is applied to an incremental storage scenario, a GET operation that carries a key to be searched for is received; after a latest value that corresponds to the key to be searched for is obtained according to the GET operation, an SSTable in which the latest value that corresponds to the key to be searched for is located is determined, and the key to be searched for is recorded in a Delete Log that corresponds to the determined SSTable.

Features of the "incremental storage scenario" are: The GET operation is performed on each key-value pair only one time, and after performing the GET operation, the server generates a new value of the key, and performs a PUT operation that carries the key and the new value.

In the optional implementation manner 2, after the to-be-compacted SSTable is determined, the method may further include: receiving a PUT operation that carries the key to be searched for. The "receiving a PUT operation that carries the key to be searched for" may be performed in any step that is after the "receiving a GET operation that carries a key to be searched for" is performed, and before a next GET operation is performed or before any PUT operation that carries a key other than the key to be searched for is performed.

For example, it can be known according to the features of the incremental storage scenario that, the server performs a PUT (a key to be searched for, a new value) operation after completing performing a GET (a key to be searched for) operation. In this way, after the PUT (a key to be searched for, a new value) operation is completed, a "latest value" obtained by the GET (a key to be searched for) operation becomes a second-latest value. In this way, it can be known that, a basic idea of the optional implementation 2 and that of the foregoing optional implementation manner 1 are the same.

It should be noted that, the foregoing optional implementation manner 1 may be applied to an incremental storage scenario and a non-incremental storage scenario, and is applicable to a scenario in which a "latest value" is in a MemTable or an SSTable. The optional implementation manner 2 is applied to an incremental storage scenario, and is applicable to a scenario in which a "latest value" is in an SSTable.

In addition, it should be noted that, in a scenario in which the optional implementation manners 1 and 2 are combined with the implementation manner that involves the "target key", the "key to be searched for" in the optional implementation manners 1 and 2 are the foregoing "target key". In addition, the optional implementation manners 1 and 2 may be used in combination with any one or more of other optional manners provided in this specification. The foregoing "the key to be searched for is recorded in a Delete Log that corresponds to the determined SSTable" may include: when the Delete Log corresponding to the determined SSTable does not include the key to be searched for, recording, in the Delete Log corresponding to the determined SSTable, the key to be searched for.

During specific implementation, when a fault occurs in the server, data in the memory of the server is lost, but data in the external storage of the server is not lost. This embodiment of the present disclose further provides a manner of creating, after a fault occurs in the server and is recovered, a Bloom filter (that is, a BFd) that corresponds to the to-be-compacted SSTable. This may include the following manner 1 and manner 2.

Manner 1: An initial value of the Bloom filter that corresponds to the to-be-compacted SSTable is set to null after the server is recovered from the fault.

For example, the initial value of the Bloom filter that corresponds to the to-be-compacted SSTable is set to null after the server is recovered from the fault. Subsequently, a key is written into the Bloom filter that corresponds to the to-be-compacted SSTable by using the foregoing optional implementation manners provided in the foregoing.

It should be noted that, although the manner 1 may, to some extent, cause repetition of a key recorded in the Delete Log that corresponds to the to-be-compacted SSTable, the manner can ensure a correct rate in a process of performing, after the server is recovered from the fault, single-file compaction according to the technical solution provided in the foregoing. In addition, the manner 1 has an advantage of being easy implement.

Manner 2: When the KV-Store system is a distributed storage system, and the Delete Log that corresponds to the to-be-compacted SSTable is a local Delete Log, after the server is recovered from the fault, an initial value of the Bloom filter that corresponds to the to-be-compacted SSTable is determined according to a key recorded in a global Delete Log. A key in the local Delete Log is recorded in the global Delete Log.

For example, when the KV-Store system is a distributed storage system, each server including a process of the KV-Store system may create, in the external storage of the server, a Delete Log for each local SSTable. The Delete Log may be referred to as a "local Delete Log". In addition, a global Delete Log may be created in one or more of the servers, and is used to record keys in the local Delete Log in each server that includes a process of the KV-Store system, to implement backup of the local Delete Log. In this way, after one or more of the servers including processes of the KV-Store system are recovered from a fault, a key in the local Delete Log of the server that has been recovered from a fault may be obtained from the global Delete Log.

It should be noted that, during specific implementation, each server that includes a process of the KV-Store system may write the local Delete Log into the global Delete Log at a specific time point, periodically, or when being triggered. In addition, when a fault occurs in one or more of the servers, servers in which no fault occurs may transfer data of the KV-Store system, in the servers in which the fault occurs, into storage units in the servers in which no fault occurs. The transferring manner is not limited in this embodiment of the present disclose. For example, the data may be transferred by using information recorded in the global Delete Log.

Embodiment 2

Figure 4:
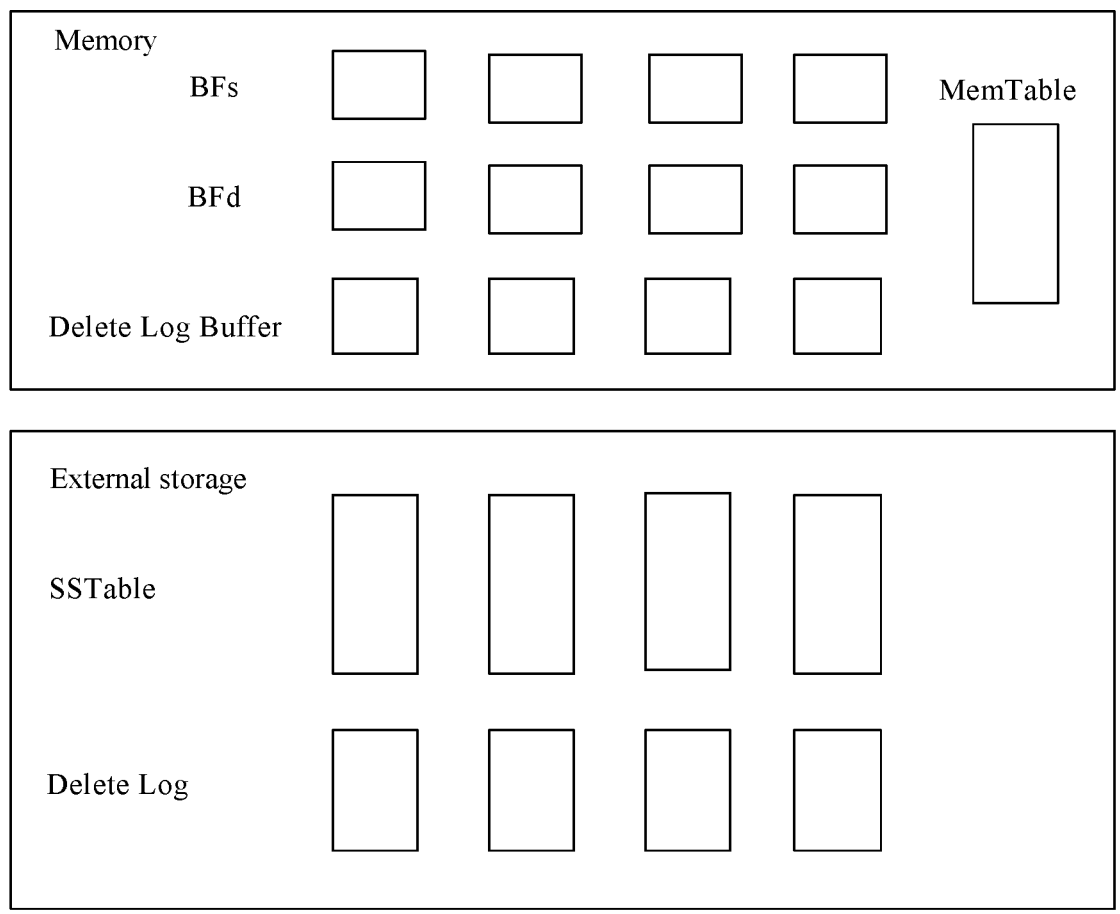
FIG. 4 is a schematic diagram of a data structure in a server according to a Embodiment 2 of the present disclose.

This embodiment provides two methods for recording a key in a Delete Log. The two methods are applied to a server including a KV-Store system. A data structure in the server is shown in FIG. 4. The server in FIG. 4 includes a memory and an external storage. A MemTable, several BFss, several BFds and several Delete Log buffers are set in the memory. Several SSTables and several Delete Logs are set in the external storage. Each SSTable corresponds to a BFs. Each SSTable corresponds to a Delete Log. Each SSTable corresponds to a BFd, and each Delete Log corresponds to a Delete Log buffer.

It should be noted that, during specific implementation, each SSTable in the server shown in FIG. 4 may also correspond to one or more block indexes. The block indexes are not shown in FIG. 4.

Figure 5:
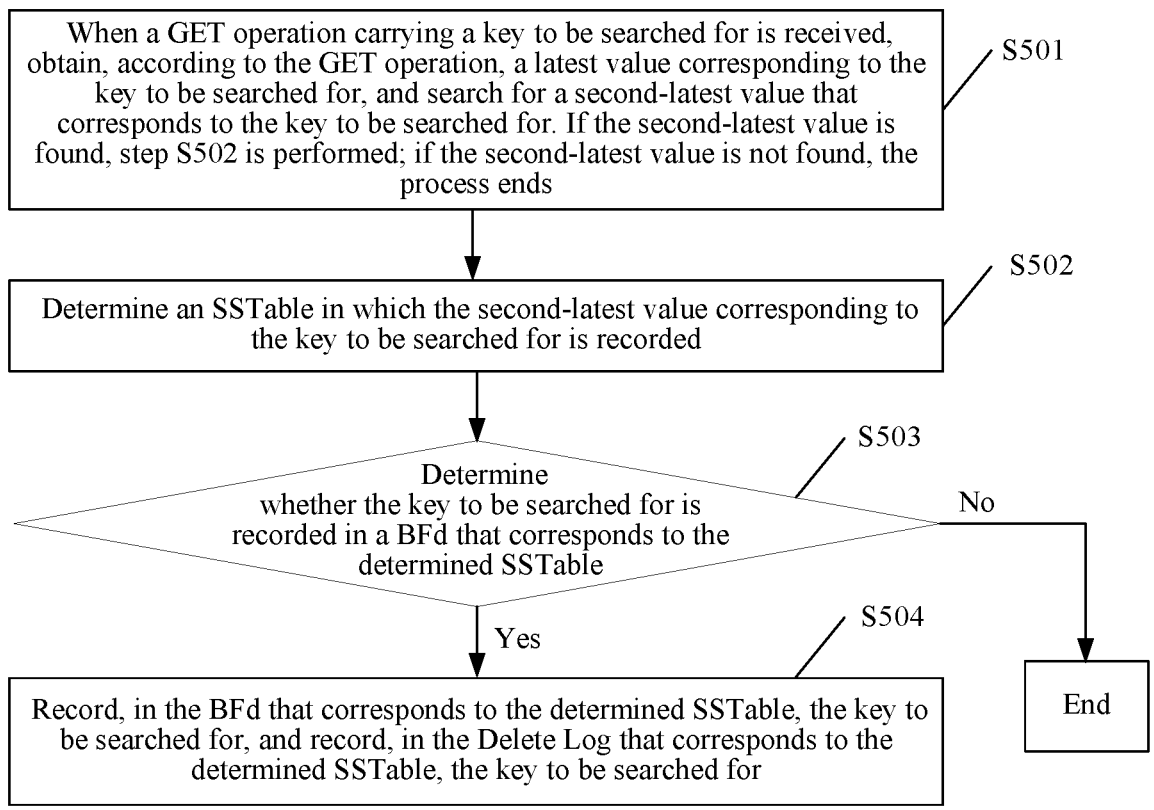
FIG. 5 is a schematic flowchart of a method for recording a key in a Delete Log according to Embodiment 2 of the present disclose.

Method 1 for recording a key in a Delete Log:

Referring to FIG. 5, FIG. 5 is a schematic flowchart of a method for recording a key in a Delete Log according to this embodiment. The method shown in FIG. 5 may be applied to an incremental storage scenario and a non-incremental storage scenario. The method may include the following steps S501 to S504.

S501: When a GET operation carrying a key to be searched for is received, obtain, according to the GET operation, a latest value corresponding to the key to be searched for, and search for a second-latest value that corresponds to the key to be searched for. If the second-latest value is found, step S502 is performed; if the second-latest value is not found, the process ends.

S502: Determine an SSTable in which the second-latest value corresponding to the key to be searched for is recorded.

S503: Determine whether the key to be searched for is recorded in a BFd that corresponds to the determined SSTable.

If the key to be searched for is recorded in the BFd that corresponds to the determined SSTable, it indicates that the key to be searched for is recorded in a Delete Log that corresponds to the to-be-compacted SSTable, and the process ends. If the key to be searched for is not recorded in the BFd that corresponds to the determined SSTable, step S504 is performed.

S504: Record, in the BFd that corresponds to the determined SSTable, the key to be searched for, and record, in the Delete Log that corresponds to the determined SSTable, the key to be searched for.

Step S504 may include: recording, in the BFd that corresponds to the to-be-compacted SSTable, the key to be searched for, and recording, in a Delete Log buffer that corresponds to the to-be-compacted SSTable, the key to be searched for. If the Delete Log buffer is full, the key recorded in the Delete Log buffer is written into the Delete Log that corresponds to the to-be-compacted SSTable.

For example, in the method 1, the server may perform a GET (Key) operation according to the following algorithm:

```
GET (Key)
   1.    value=NULL;
   2.    For (i=max_SSTable_id; i>=min_SSTable_id; i--){
   3.        if (BFs[i].contains (Key)){
   4.            value=SSTable[i].read (Key);
   5.            if (value! = NULL){// SSTable[i] includes a latest value that correponds to a key to be searched for
   6.                for (j=i-1; j>=min_SSTable_id; j--){
   7.                    if (BFd[j].contains (Key)){
   8.                        break; //the key to be searched for is already recorded, and is not recorded repeatedly
   9.                    }
  10.                    if (BFs[j].contains (Key)){
  11.                        //SSTable[j] includes a second-latest value that corresponds to
```

```
the key to be searched for
        12.                    delete_log.append (j, Key);
        13.                    BFd[j].add (Key);
        14.                    break;
        15.                }
        16.            }
        17.            return value;
        18.        }
        19.    }
        20. }
```

It should be noted that, code in the fifth line indicates that the server finds, for the first time, the key to be searched for. A value corresponding to the key that is to be searched for and that is found this time is a latest value corresponding to the key to be searched for. In addition, an SSTable in which the latest value is located is an SSTable[i]. A code in the tenth line indicates that the server finds, for the second time, the key to be searched. A value corresponding to the key that is to be searched for and that is found this time is a second-latest value corresponding to the key to be searched for. In addition, an SSTable in which the second-latest value is located is an SSTable[j].

Method 2 for recording a key in a Delete Log.

Figure 6:
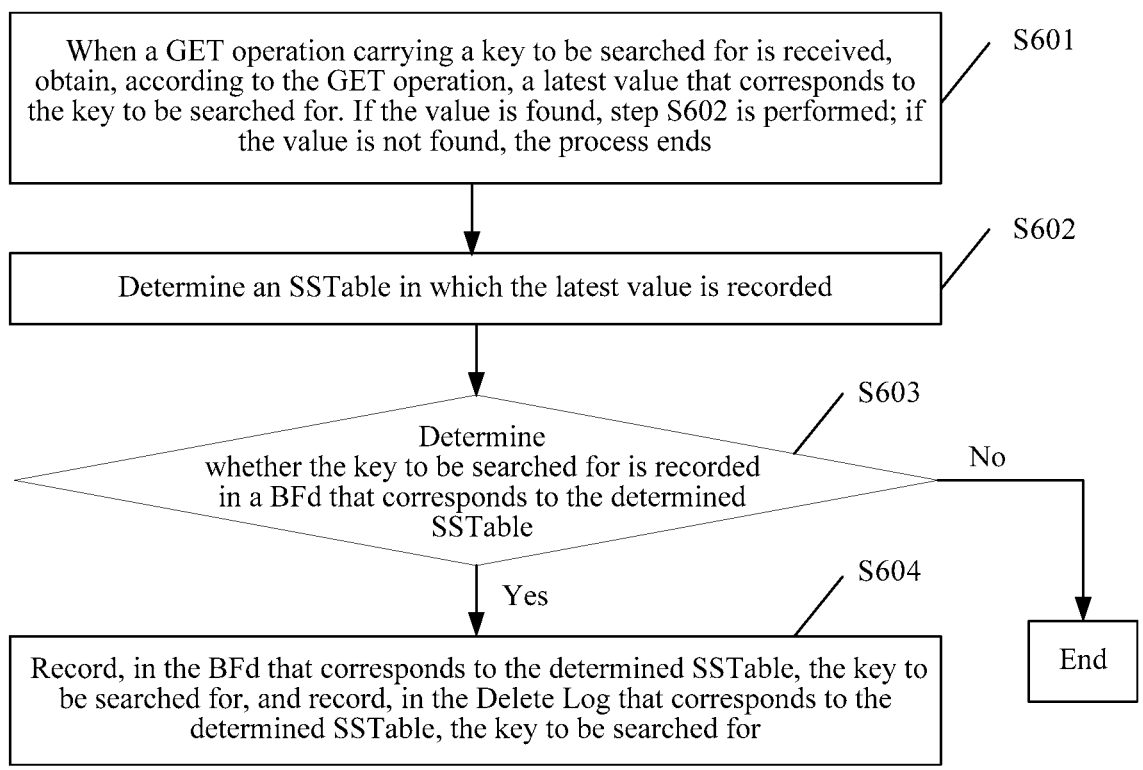
FIG. 6 is a schematic flowchart of another method for recording a key in a Delete Log according to Embodiment 2 of the present disclose.

Referring to FIG. 6, FIG. 6 is a schematic flowchart of another method for recording a key in a Delete Log according to an embodiment. The method shown in FIG. 6 is applied to an incremental storage scenario. The method may include the following steps S601 to S604.

S601: When a GET operation carrying a key to be searched for is received, obtain, according to the GET operation, a latest value that corresponds to the key to be searched for. If the value is found, step S602 is performed; if the value is not found, the process ends.

S602: Determine an SSTable in which the latest value is recorded.

S603 to S604 are the same as the foregoing S503 to S504.

For example, in the method 2, the server may perform a GET (Key) operation in an incremental storage scenario according to the following algorithm.

```
GET (Key) in an incremental storage scenario
    1.  For (i=max_SSTable_id; i>=min_SSTable_id; i--) {
    2.      if (BFs[i].contains (Key)) {
    3.          value= SSTable[i].read (Key);
    4.          delete_log.append (i, Key);
    5.          return value;
    6.      }
    7.  }
    8. }
```

Embodiment 3

Figure 7:
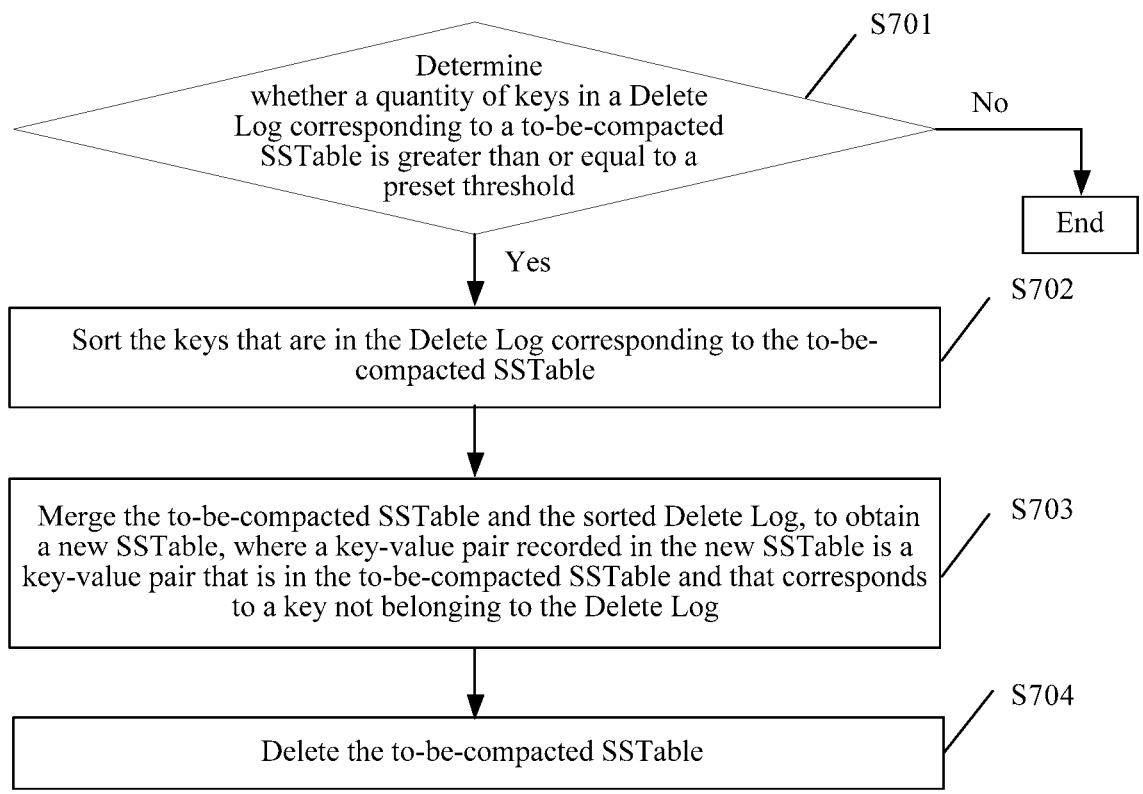
FIG. 7 is a schematic flowchart of a method for file compaction in a KV-Store system based on FIG. 5 or FIG. 6 according to Embodiment 3 of the present disclose.

Referring to FIG. 7, FIG. 7 is a schematic flowchart of a method for file compaction in a KV-Store system based on FIG. 5 and FIG. 6 according to this embodiment. The method shown in FIG. 7 includes the following steps S701 to S704.

S701: Determine whether a quantity of keys in a Delete Log corresponding to a to-be-compacted SSTable is greater than or equal to a preset threshold.

If the quantity of keys in the Delete Log corresponding to the to-be-compacted SSTable is greater than or equal to the preset threshold, step S702 is performed. If the quantity of keys in the Delete Log corresponding to the to-be-compacted SSTable is not greater than or equal to the preset threshold, the process ends.

The "to-be-compacted SSTable" may be any SSTable in a server in which the KV-Store system is located. During specific implementation, the server may perform step S701 on any SSTable at a specific time, periodically, or when being triggered.

It should be noted that, when a determining result of step S701 is "not", the server does not perform a compaction operation on the to-be-compacted SSTable after performing the determining operation in step S701. In this case, the server may continue to record a key in the Delete Log, as shown in FIG. 5 or FIG. 6.

S702: Sort the keys that are in the Delete Log corresponding to the to-be-compacted SSTable.

The "sorting" performed in this step is a basis for "merging" performed in the subsequent step S703.

S703: Merge the to-be-compacted SSTable and the sorted Delete Log, to obtain a new SSTable, where a key-value pair recorded in the new SSTable is a key-value pair that is in the to-be-compacted SSTable and that corresponds to a key not belonging to the Delete Log.

S704: Delete the to-be-compacted SSTable.

For example, step S703 may be implemented by using the following algorithm:

```
SingleCompact (SSTable)
    1.  Sort delete_log;
    2.  key_d=delete_log.getNext ( );
    3.  Init SSTable_new;
    4.  while (((key_s, value)=SSTable.getNext ( ))! =null){
    5.      while (key_s>key_d) key_d=delete_log.getNext ( );
    6.      if (key_s==key_d){//delete this key
    7.      }
    8.      else if (key_s<key_d){//reserve this key
    9.          SSTable_new.add (key_s, value);
    10.     }
    11. }
```

The following describes, by using a specific example, the method provided in FIG. 5 for recording a key in a Delete Log and the method for file compaction in a KV-Store system based on FIG. 5.

It is assumed that at a particular time point, Delete Logs corresponding to all SSTables in the KV-Store system are null, that is, no key is recorded in any Delete Log. In this case, keys recorded in a MemTable and SSTables in the KV-Store system are shown in Table. 1:

TABLE 1

| MemTable/SSTable | Key |
| --- | --- |
| MemTable | Key 1, key 2, key 3 |
| SSTable 1 | Key 1, key 2, key 3, key 4, key 5 |
| SSTable 2 | Key 1, key 4, key 5, key 7, key 8 |
| SSTable 3 | Key 2, key 3, key 6, key 8, key 9 |

Based on Table 1, after a server successively performs GET (Key 1), GET (Key 2), GET (Key 3), GET (Key 4), and GET (Key 5), keys in the Delete Log corresponding to each SSTable in the KV-Store system are shown in Table. 2:

TABLE 2

| SSTable | Delete Log | Key |
| --- | --- | --- |
| SSTable 1 | Delete Log 1 | Key 1, key 2, key 3 |
| SSTable 2 | Delete Log 2 | Key 4, key 5 |
| SSTable 3 | Delete Log 3 | Null |

It is assumed that a "preset threshold" is 3; then, in Table 2, a quantity of keys in Delete Log 1 satisfies being "greater than or equal to the preset threshold". In this case, the server may merge SSTable 1 and Delete Log 1, and a new SSTable 1 is obtained after the merging. In this case, keys recorded in the MemTable and the SSTables in the KV-Store system are shown in Table. 3:

TABLE 3

| MemTable/SSTable | Key |
| --- | --- |
| MemTable | Key 1, key 2, key 3 |
| New SSTable 1 | Key 4, and key 5 |
| SSTable 2 | Key 1, key 4, key 5, key 7, key 8 |
| SSTable 3 | Key 2, key 3, key 6, key 8, key 9 |

Next, based on Table 3, after the server successively performs GET (Key 1), GET (Key 2), GET (Key 3), GET (Key 4), and GET (Key 5), keys in the Delete Log corresponding to each SSTable in the KV-Store system are shown in Table. 4:

TABLE 4

| SSTable | Delete Log | Key |
| --- | --- | --- |
| New SSTable 1 | New Delete Log 1 | Null |
| SSTable 2 | Delete Log 2 | Key 1, key 4, key 5 |
| SSTable 3 | Delete Log 3 | Key 2, key 3 |

It is assumed that a "preset threshold" is 3; then, in Table 4, a quantity of keys in Delete Log 2 satisfies being "greater than or equal to the preset threshold". In this case, the server may merge SSTable 2 and Delete Log 2, and a new SSTable 2 is obtained after the merging. In this case, keys recorded in the MemTable and the SSTables in the KV-Store system are shown in Table. 5:

TABLE 5

| MemTable/SSTable | Key |
| --- | --- |
| MemTable | Key 1, key 2, key 3 |
| New SSTable 1 | Key 4, key 5 |
| New SSTable 2 | Key 7, key 8 |
| SSTable 3 | Key 2, key 3, key 6, key 8, key 9 |

The rest can be done in the same manner, and the server may compact any SSTable corresponding to a Delete Log in which a quantity of keys satisfies being "greater than or equal to a preset threshold", so that an objective of reducing storage space is achieved.

It should be noted that, according to this example, a person in the art may derive, without creative efforts, a specific example of the method provided in FIG. 6 for recording a key in a Delete Log and the method for file compaction in a KV-Store system based on FIG. 6.

It should be noted that, in any of the foregoing embodiments or optional implementation manners, when a Delete Log is shared by multiple SSTables, the Delete Log may be divided into multiple Delete Blocks. Each Delete Block is used to record keys that correspond to non-latest values in an SSTable. Keys corresponding to non-latest values in an SSTable may be separately recorded in multiple Delete Blocks. Keys corresponding to non-latest values in an SSTable may be separately recorded in multiple continuous or discontinuous Delete Blocks in a Delete Log.

When keys corresponding to non-latest values in an SSTable are separately recorded in multiple discontinuous Delete Blocks in a Delete Log, that is, when one SSTable corresponds to multiple discontinuous Delete Blocks, the server may save, in a memory, a position of a last Delete Block that corresponds to each SSTable, and record, when a next Delete Block is generated, a position of a previous Delete Block into the new Delete Block, so that a single link from back to forward is formed. When keys corresponding to non-latest values in an SSTable need to be read, the keys recorded in multiple Delete Blocks that correspond to the SSTable may be read in a direction from back to forward according to the single link.

Figure 8:
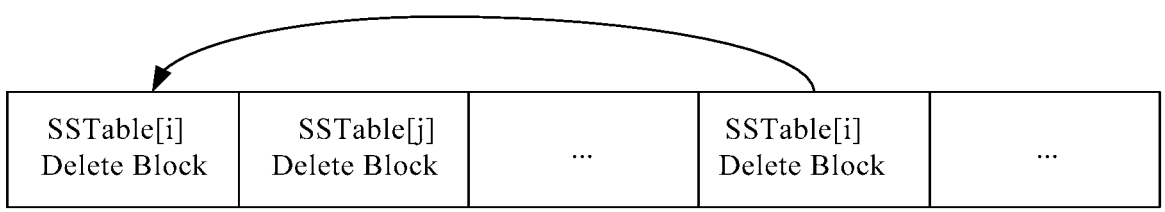
FIG. 8 is a schematic structural diagram of a Delete Log according to an embodiment of the present disclose.

Referring to FIG. 8, FIG. 8 is a schematic structural diagram of a Delete Log according to an embodiment of the present disclose. In the Delete Log shown in FIG. 8, one SSTable corresponds to multiple discontinuous Delete Blocks. SSTable[i] represents an $i^{th}$ SSTable. SSTable[j] represents a $jt^h$ SSTable. Both i and j are integers greater than or equal to 0, and i is not equal to j.

Embodiment 4

Figure 9:
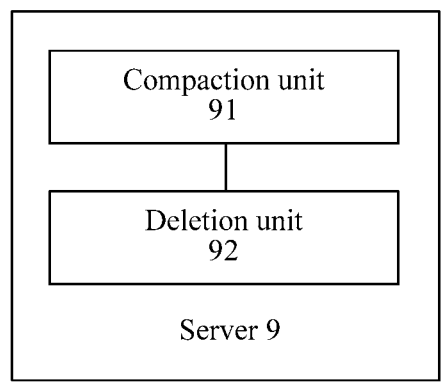
FIG. 9 is a schematic structural diagram of a server according to Embodiment 4 of the present disclose.

Referring to FIG. 9, FIG. 9 is a schematic structural diagram of a server according to an embodiment of the present disclose. The server shown in FIG. 9 is configured to perform any method provided above for file compaction in a KV-Store system. Reference may be made to the foregoing method embodiments for explanations about related content in this embodiment. Details are not described herein again.

The server 9 shown in FIG. 9 includes a KV-Store system, and the server 9 may include a compaction unit 91 and a deletion unit 92.

The compaction unit 91 is configured to compact, according to a to-be-deleted log Delete Log corresponding to a to-be-compacted sorted string table SSTable, the to-be-compacted SSTable, to generate a new SSTable, where a key corresponding to a non-latest value that is in the KV-Store system and that is stored in the to-be-compacted SSTable is recorded in the Delete Log, and the new SSTable does not include a key-value pair that corresponds to the key in Delete Log.

The deletion unit 92 is configured to delete the to-be-compacted SSTable.

Figure 10:
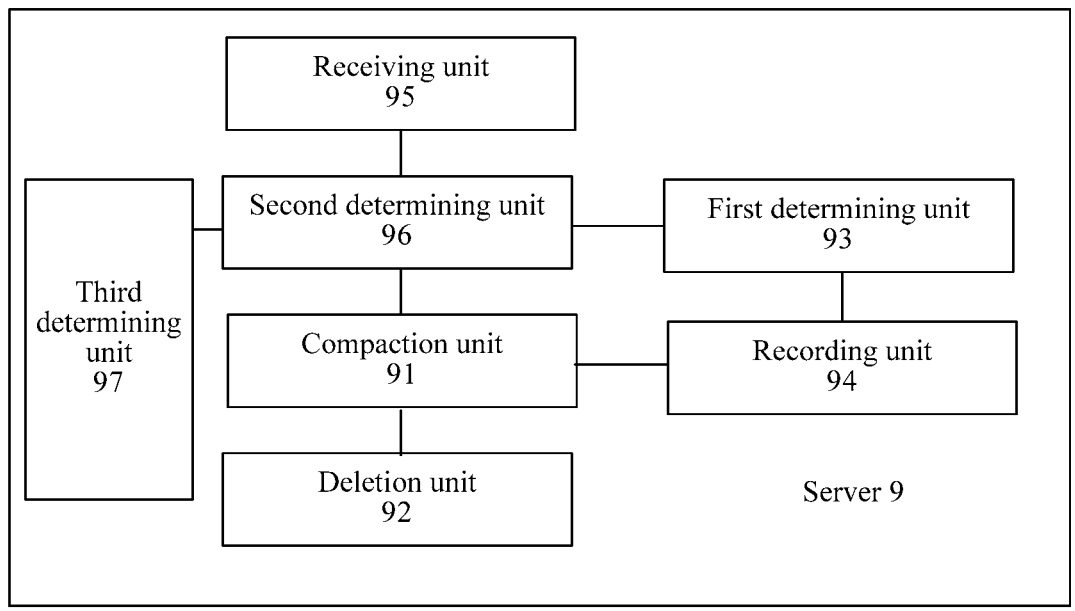
FIG. 10 is a schematic structural diagram of another server according to Embodiment 4 of the present disclose.

Optionally, as shown in FIG. 10, the server 9 may further include:

a first determining unit 93, configured to determine, in the to-be-compacted SSTable, the key that corresponds to the non-latest value in the KV-Store system as a target key; and a recording unit 94, configured to record the target key in the Delete Log.

For example, the recording unit 96 may be configured to record the target key in the Delete Log after it is determined that the Delete Log does not include the target key.

Optionally, the compaction unit 91 may be configured to copy a key-value pair that is in the to-be-compacted SSTable and that corresponds to a key not belonging to the Delete Log, to generate a new SSTable.

In an optional implementation manner, as shown in FIG. 10, the server 1 may further include: a receiving unit 95, configured to receive a GET operation that carries a key to be searched for; and a second determining unit 96, configured to: determine, after a latest value that corresponds to the key to be searched for is obtained according to the GET operation, an SSTable in which a second-latest value that corresponds to the key to be searched for is located, and record, in a Delete Log that corresponds to the determined SSTable, the key to be searched for.

In another optional implementation manner, the KV-Store system is applied to an incremental storage scenario. In this case, as shown in FIG. 10, the server 1 may further include: a receiving unit 95, configured to receive a GET operation that carries a key to be searched for; and a second determining unit 96, configured to: determine, after a latest value that corresponds to the key to be searched for is obtained according to the GET operation, an SSTable in which a second-latest value that corresponds to the key to be searched for is located, and record, in a Delete Log that corresponds to the determined SSTable, the key to be searched for. The receiving unit 95 may further be configured to receive a PUT operation that carries the key to be searched for.

For example, in the foregoing two optional implementation manners, when recording, in the Delete Log that corresponds to the determined SSTable, the key to be searched for, the second determining unit 96 is configured to: when the Delete Log that corresponds to the determined SSTable does not include the key to be searched for, record, in the Delete Log that corresponds to the determined SSTable, the key to be searched for.

Optionally, the compaction unit 91 may be configured to compact the to-be-compacted SSTable according to the Delete Log when a quantity of keys in the to-be-deleted log Delete Log that corresponds to the to-be-compacted sorted string table SSTable is greater than or equal to a preset threshold, to generate a new SSTable.

Optionally, the to-be-compacted SSTable corresponds to a Bloom filter. Keys in the Delete Log are recorded in the Bloom filter. As shown in FIG. 10, the server 9 may further include a third determining unit 97, the third determining unit 97 is configured to: set an initial value of the Bloom filter to null after a server in which the KV-Store system is located is recovered from a fault; or when the KV-Store system is a distributed storage system and the Delete Log is a local Delete Log, determine, after the server in which the KV-Store system is recovered from a fault, an initial value of the Bloom filter according to keys recorded in a global Delete Log, where keys in the local Delete Log are recorded in the global Delete Log.

In the server provided in this embodiment, a to-be-compacted SSTable is compacted according to a Delete Log that corresponds to the to-be-compacted SSTable, to generate a new SSTable. A key corresponding to a non-latest value that is in the KV-Store system and that is stored in the to-be-compacted SSTable is recorded in the Delete Log, and the new SSTable does not include a key-value pair that corresponds to the key in Delete Log. Then, the to-be-compacted SSTable is deleted, thereby implementing single-file compaction. In this method, data in only one SSTable needs to be read each time a compaction operation is performed; compared with the method for multi-file compaction in the prior art, fewer I/O bandwidth and memory resources are occupied. In this way, while a compaction operation is performed by using this method, more resources may be reserved for other operations, so that rates of performing other operations are not affected, thereby improving user experience.

Embodiment 5

During hardware implementation, one or more of the compaction unit 91, the deletion unit 92, the first determining unit 93, the recording unit 94, the receiving unit 95, the second determining unit 96, and the third determining unit 97 in the foregoing Embodiment 4 are embedded in or separate from a processor of the server 9 in a form of hardware, or may be stored in the memory of the server 9 in a form of software, so as to be easily invoked by the processor, to perform operations corresponding to the foregoing modules. The processor may be a central processing unit (CPU), a microprocessor, a single-chip microcomputer, or the like.

Figure 11:
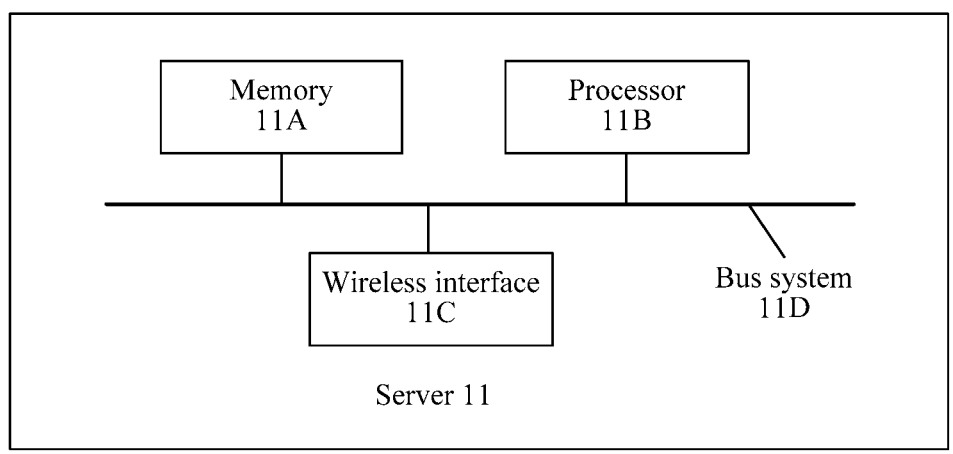
FIG. 11 is a schematic structural diagram of a server according to Embodiment 5 of the present disclose.

Referring to FIG. 11, FIG. 11 is a schematic structural diagram of a server according to an embodiment of the present disclose. The server shown in FIG. 11 is configured to perform any method provided above for file compaction in a KV-Store system. Reference may be made to the foregoing method embodiments for explanations about related content in this embodiment. Details are not described herein again.

The server 11 shown in FIG. 11 includes a KV-Store system. The server 11 may include: a memory 11A, a processor 11B, a wireless interface 11C, and a bus system 11D. The memory 11A, the processor 11B, and the wireless interface 11C are coupled by using the bus system 11D.

The memory 11A may include a high-speed random access memory (RAM), or may include a non-volatile memory, for example, at least one magnetic disk memory.

The wireless interface 11C is configured to enable the server 11 to communicate with another communications device.

The bus system 11D may be an Industry Standard Architecture (ISA) bus, a Peripheral Component Interconnect (PCI) bus, an Extended Industry Standard Architecture (EISA) bus, and the like. The bus system 11D may include, in addition to a data bus, a power bus, a control bus, a signal status bus, and the like. However, for the purpose of clear description, all buses are marked as the bus system 11D in the figure.

The memory 11A is configured to store a program. The program may include program code, and the program code includes a computer operation instruction.

The processor 11B executes the program stored in the memory 11A, to implement the method for file compaction in a KV-Store system provided in this embodiment of the present disclose. The method may include: compacting, according to a to-be-deleted log Delete Log that corresponds to a to-be-compacted sorted string table SSTable, the to-becompacted SSTable, to generate a new SSTable, where a key corresponding to a non-latest value that is in the KV-Store system and that is stored in the to-be-compacted SSTable is recorded in the Delete Log, and the new SSTable does not include a key-value pair that corresponds to the key in Delete Log; and deleting the to-be-compacted SSTable.

Optionally, the processor 11B may be further configured to: determine, in the to-be-compacted SSTable, the key that corresponds to the non-latest value in the KV-Store system as a target key; and record the target key in the Delete Log.

For example, when recording the target key in the Delete Log, the processor 11B may be configured to record the target key in the Delete Log when determining that the Delete Log does not include the target key.

Optionally, when compacting, according to a to-be-deleted log Delete Log that corresponds to a to-be-compacted sorted string table SSTable, the to-be-compacted SSTable, to generate a new SSTable, the processor 11B may be configured to copy a key-value pair that is in the to-be-compacted SSTable and that corresponds to a key not belonging the Delete Log, to generate a new SSTable.

In an optional implementation manner, the processor 11B may be further configured to: receive a GET operation that carries a key to be searched for; determine, after a latest value that corresponds to the key to be searched for is obtained according to the GET operation, an SSTable in which a second-latest value that corresponds to the key to be searched for is located, and record, in a Delete Log that corresponds to the determined SSTable, the key to be searched for.

In another optional implementation manner, the KV-Store system is applied to an incremental storage scenario. The processor 11B may be further configured to: receive a GET operation that carries a key to be searched for; determine, after a latest value that corresponds to the key to be searched for is obtained according to the GET operation, an SSTable in which the latest value that corresponds to the key to be searched for is located, and record, in a Delete Log that corresponds to the determined SSTable, the key to be searched for, and receive a PUT operation that carries a key to be searched for.

For example, in the foregoing two optional implementation manners, when recording, in the Delete Log that corresponds to the determined SSTable, the key to be searched for, the processor 11B is configured to: when the Delete Log that corresponds to the determined SSTable does not include the key to be searched for, record, in the Delete Log that corresponds to the determined SSTable, the key to be searched for.

Optionally, when compacting, according to a to-be-deleted log Delete Log that corresponds to a to-be-compacted sorted string table SSTable, the to-be-compacted SSTable, to generate a new SSTable, the processor 11B may be configured to: compact the to-be-compacted SSTable according to the Delete Log when a quantity of keys in the to-be-deleted log Delete Log that corresponds to the to-be-compacted sorted string table SSTable is greater than or equal to a preset threshold, to generate a new SSTable.

Optionally, the to-be-compacted SSTable corresponds to a Bloom filter. Keys in the Delete Log are recorded in the Bloom filter. The processor 11B may be further configured to: set an initial value of the Bloom filter to null after a server in which the KV-Store system is located is recovered from a fault, or when the KV-Store system is a distributed storage system and the Delete Log is a local Delete Log, determine, after the server in which the KV-Store system is recovered from a fault, an initial value of the Bloom filter according to keys recorded in a global Delete Log, where keys in the local Delete Log are recorded in the global Delete Log.

In the server provided in this embodiment, a to-be-compacted SSTable is compacted according to a Delete Log that corresponds to the to-be-compacted SSTable, to generate a new SSTable. A key corresponding to a non-latest value that is in the KV-Store system and that is stored in the to-be-compacted SSTable is recorded in the Delete Log, and the new SSTable does not include a key-value pair that corresponds to the key in Delete Log. Then, the to-be-compacted SSTable is deleted, thereby implementing single-file compaction. In this method, data in only one SSTable needs to be read each time a compaction operation is performed; compared with the method for multi-file compaction in the prior art, fewer I/O bandwidth and memory resources are occupied. In this way, while a compaction operation is performed by using this method, more resources may be reserved for other operations, so that rates of performing other operations are not affected, thereby improving user experience.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be another division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclose may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclose. The foregoing storage medium includes: any medium that can store program code, such as a USB flash drive, a removable hard disk, a read-only memory (ROM), a RAM, a magnetic disk, or an optical disc.

Finally, it should be noted that the foregoing embodiments are merely intended for describing the technical solutions of the present disclose, but not for limiting the present disclose. Although the present disclose is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclose.

What is claimed is:

1. A method for file compaction in a key-value store (KV-Store) system, comprising:
   compacting, according to a to-be-deleted log (Delete Log) that corresponds to a to-be-compacted sorted string table (SSTable), the to-be-compacted SSTable to generate a new SSTable, wherein a first key corresponding to a non-latest value of the first key in the KV-Store system and stored in the to-be-compacted SSTable is recorded in the Delete Log, and wherein the new SSTable includes a key-value pair corresponding to a second key different from the first key and does not include a key-value pair that corresponds to the first key in the Delete Log; and
   deleting the to-be-compacted SSTable.

2. The method according to claim 1, wherein before the compacting the to-be-compacted SSTable to generate the new SSTable, the method further comprises:
   determining, in the to-be-compacted SSTable, the first key that corresponds to the non-latest value of the first key in the KV-Store system as a target key; and
   recording the target key in the Delete Log.

3. The method according to claim 2, wherein the recording the target key in the Delete Log comprises:
   determining the Delete Log does not include the target key; and
   in response to determining that the Delete Log does not include the target key, recording the target key in the Delete Log.

4. The method according to claim 1, wherein the compacting the to-be-compacted SSTable to generate the new SSTable comprises:
   copying a key-value pair in the to-be-compacted SSTable and that corresponds to a third key not belonging to the Delete Log to generate the new SSTable.

5. The method according to claim 1, wherein before the compacting the to-be-compacted SSTable to generate the new SSTable, the method further comprises:
   receiving a GET operation that carries a key to be searched for;
   obtaining a latest value that corresponds to the key to be searched for according to the GET operation;
   determining an SSTable in which a second-latest value that corresponds to the key to be searched for is located; and
   recording, in a Delete Log that corresponds to the determined SSTable, the key to be searched for.

6. The method according to claim 1, wherein the KV-Store system is applied to an incremental storage scenario, and before the compacting the to-be-compacted SSTable to generate the new SSTable, the method further comprises:
   receiving a GET operation that carries a key to be searched for;
   obtaining a latest value that corresponds to the key to be searched for according to the GET operation;
   determining an SSTable in which the latest value that corresponds to the key to be searched for is located;
   recording, in a Delete Log that corresponds to the determined SSTable, the key to be searched for; and
   receiving a PUT operation that carries the key to be searched for.

7. The method according to claim 6, wherein the recording, the key to be searched for comprises:
   recording the key to be searched for in the Delete Log that corresponds to the determined SSTable when the Delete Log that corresponds to the determined SSTable does not include the key to be searched for.

8. The method according to claim 1, wherein the compacting the to-be-compacted SSTable to generate the new SSTable comprises:
   compacting the to-be-compacted SSTable according to the Delete Log to generate the new SSTable when a quantity of keys in the Delete Log that corresponds to the to-be-compacted SSTable is no less than a preset threshold.

9. The method according to claim 1, wherein the to-be-compacted SSTable corresponds to a Bloom filter, wherein keys in the Delete Log are recorded in the Bloom filter, and wherein the method further comprises:
   setting an initial value of the Bloom filter to null after a server in which the KV-Store system is located is recovered from a fault.

10. The method according to claim 1, wherein the to-be-compacted SSTable corresponds to a Bloom filter, wherein keys in the Delete Log are recorded in the Bloom filter, wherein the KV-Store system is a distributed storage system and the Delete Log is a local Delete Log, and wherein the method further comprises:
    determining, after a server in which the KV-Store system is located is recovered from a fault, an initial value of the Bloom filter according to keys recorded in a global Delete Log, wherein keys in the local Delete Log are recorded in the global Delete Log.

11. A server, wherein the server comprises at least one processor and a memory, wherein the memory has a plurality of instructions stored thereon, wherein the instructions are associated with file compaction in a key-value store (KV-Store) system, and wherein the instructions, when processed by the at least one processor, cause the server to:
    compact, according to a to-be-deleted log (Delete Log) that corresponds to a to-be-compacted sorted string table (SSTable), the to-be-compacted SSTable to generate a new SSTable, wherein a first key corresponding to a non-latest value of the first key in the KV-Store system and stored in the to-be-compacted SSTable is recorded in the Delete Log, and wherein the new SSTable includes a key-value pair corresponding to a second key different from the first key and does not include a key-value pair that corresponds to the first key in the Delete Log; and
    delete the to-be-compacted SSTable.

12. The server according to claim 11, wherein the instructions, when processed by the at least one processor, cause the server to:
    determine, in the to-be-compacted SSTable, the first key that corresponds to the non-latest value of the first key in the KV-Store system as a target key; and
    record the target key in the Delete Log.

13. The server according to claim 12, wherein the recording the target key in the Delete Log comprises:
    determining that the Delete Log does not include the target key; and in response to determining that the Delete Log does not include the target key, recording the target key in the Delete Log.

14. The server according to claim 11, wherein the compacting the to-be-compacted SSTable to generate the new SSTable comprises:
copying a key-value pair in the to-be-compacted SSTable and that corresponds to a key not belonging to the Delete Log to generate the new SSTable.

15. The server according to claim 11, wherein the instructions, when processed by the at least one processor, cause the server to, before the compacting the to-be-compacted SSTable to generate the new SSTable:
receive a GET operation that carries a key to be searched for;
obtain a latest value that corresponds to the key to be searched according to the GET operation;
determine an SSTable in which a second-latest value that corresponds to the key to be searched for is located; and
recording, in a Delete Log that corresponds to the determined SSTable, the key to be searched for.

16. The server according to claim 11, wherein the KV-Store system is applied to an incremental storage scenario, and the instructions, when processed by the at least one processor, cause the server, before the compacting the to-be-compacted SSTable to generate the new SSTable, to:
receive a GET operation that carries a key to be searched for;
obtain a latest value that corresponds to the key to be searched for according to the GET operation;
determine an SSTable in which the latest value that corresponds to the key to be searched for is located;
record, in a Delete Log that corresponds to the determined SSTable, the key to be searched for; and
receive a PUT operation that carries the key to be searched for.

17. The server according to claim 16, wherein the recording the key to be searched for comprises:
recording the key to be searched for in the Delete Log that corresponds to the determined SSTable when the Delete Log that corresponds to the determined SSTable does not include the key to be searched for.

18. The server according to claim 11, wherein the compacting the to-be-compacted SSTable to generate the new SSTable comprises:
compacting the to-be-compacted SSTable according to the Delete Log to generate the new SSTable when a quantity of keys in the Delete Log that corresponds to the to-be-compacted SSTable is no less than a preset threshold.

19. The server according to claim 11, wherein the to-be-compacted SSTable corresponds to a Bloom filter, wherein keys in the Delete Log are recorded in the Bloom filter, and wherein the instructions, when processed by the at least one processor, cause the server to:
set an initial value of the Bloom filter to null after a server in which the KV-Store system is located is recovered from a fault.

20. The server according to claim 11, wherein the to-be-compacted SSTable corresponds to a Bloom filter, wherein keys in the Delete Log are recorded in the Bloom filter, wherein the KV-Store system is a distributed storage system and the Delete Log is a local Delete Log, and wherein the instructions, when processed by the at least one processor, cause the server to:
determine, after a server in which the KV-Store system is located is recovered from a fault, an initial value of the Bloom filter according to keys recorded in a global Delete Log, wherein keys in the local Delete Log are recorded in the global Delete Log.

* * * * *